US009808963B2

(12) United States Patent
Feichtinger et al.

(10) Patent No.: US 9,808,963 B2
(45) Date of Patent: Nov. 7, 2017

(54) METHOD FOR RECYCLING PLASTIC MATERIALS

(75) Inventors: Klaus Feichtinger, Linz (AT);
Manfred Hackl, Linz-Urfahr (AT);
Gerhard Wendelin, Linz (AT)

(73) Assignee: EREMA ENGINEERING RECYCLING MASCHINEN UND ANLAGEN GESELLSCHAFT M.B.H., Anselfden (AT)

( * ) Notice: Subject to any disclaimer, the term of this patent is extended or adjusted under 35 U.S.C. 154(b) by 689 days.

(21) Appl. No.: 13/264,818

(22) PCT Filed: Apr. 14, 2010

(86) PCT No.: PCT/AT2010/000105
§ 371 (c)(1),
(2), (4) Date: Dec. 21, 2011

(87) PCT Pub. No.: WO2010/118447
PCT Pub. Date: Oct. 21, 2010

(65) Prior Publication Data
US 2012/0091609 A1    Apr. 19, 2012

(30) Foreign Application Priority Data

Apr. 17, 2009  (AT) .................................. A 599/2009

(51) Int. Cl.
*B29B 17/00*  (2006.01)
*B02C 23/00*  (2006.01)
(Continued)

(52) U.S. Cl.
CPC ........ *B29B 17/0036* (2013.01); *B29B 13/022* (2013.01); *B29B 13/10* (2013.01);
(Continued)

(58) Field of Classification Search
CPC ............ B29B 17/0026; B29B 17/0412; B29B 2017/0224; B29B 2017/048;
(Continued)

(56) References Cited

U.S. PATENT DOCUMENTS 3,486,192 A    12/1969  Le Roy
2004/0229030 A1*  11/2004  Owensby .................. 428/316.6
(Continued)

FOREIGN PATENT DOCUMENTS

| AT | 400 315 B | 12/1995 |
| DE | 198 60 352 A1 | 9/1999 |
| WO | WO 2008/061269 A1 | 5/2008 |

OTHER PUBLICATIONS

Potente, H., et al., "Analyse der Homogenisiereffekte un Nutbuchsenextrudern," Plastverarbeiter, Huethig GmbH, vol. 39, No. 10, pp. 160-168.

(Continued)

*Primary Examiner* — Robert J Grun
(74) *Attorney, Agent, or Firm* — Kilpatrick Townsend & Stockton LLP

(57) ABSTRACT

The invention relates to a method and to an assembly for recycling plastic materials, comprising the following processing steps: a) reprocessing the raw material, wherein the material, if necessary, is comminuted and brought into a fluid-like form and heated and permanently mixed, while preserving the lumpiness and pourability thereof, and optionally the viscosity thereof is increased and/or it is degassed, softened, dried and/or crystallized; b) melting the reprocessed material, at least so much that filtration is possible; c) filtering the melt in order to remove impurities; d) homogenizing the filtered melt; e) degassing the homogenized melt; and f) discharging and/or subsequently processing the melt, such as by granulation, blown film pro- (Continued)

cessing, with said processing steps being carried out consecutively in the order listed.

9 Claims, 2 Drawing Sheets

(51) Int. Cl.
| | |
|---|---|
| *B29B 17/04* | (2006.01) |
| *B29C 47/00* | (2006.01) |
| *B29C 47/08* | (2006.01) |
| *B29C 47/60* | (2006.01) |
| *B29C 47/64* | (2006.01) |
| *B29B 13/02* | (2006.01) |
| *B29B 13/10* | (2006.01) |
| *C08J 11/06* | (2006.01) |
| *B29B 17/02* | (2006.01) |
| *B29C 47/10* | (2006.01) |
| *B29C 47/68* | (2006.01) |
| *B29C 47/72* | (2006.01) |
| *B29C 47/76* | (2006.01) |
| *B29K 105/26* | (2006.01) |

(52) U.S. Cl.
CPC .......... *B29B 17/0026* (2013.01); *B29B 17/02* (2013.01); *B29B 17/04* (2013.01); *B29B 17/0412* (2013.01); *B29C 47/0004* (2013.01); *B29C 47/0011* (2013.01); *B29C 47/0054* (2013.01); *B29C 47/0871* (2013.01); *B29C 47/0884* (2013.01); *B29C 47/605* (2013.01); *B29C 47/6018* (2013.01); *B29C 47/6037* (2013.01); *B29C 47/64* (2013.01); *C08J 11/06* (2013.01); *B29B 2017/0224* (2013.01); *B29B 2017/048* (2013.01); *B29C 47/0021* (2013.01); *B29C 47/0026* (2013.01); *B29C 47/10* (2013.01); *B29C 47/68* (2013.01); *B29C 47/725* (2013.01); *B29C 47/76* (2013.01); *B29C 2791/006* (2013.01); *B29K 2105/26* (2013.01); *Y02W 30/523* (2015.05); *Y02W 30/62* (2015.05); *Y02W 30/622* (2015.05); *Y02W 30/625* (2015.05)

(58) Field of Classification Search
CPC ..... B29C 47/0011; B29C 47/10; B29C 47/64; B29C 47/68; B29C 47/725; B29C 47/76; B29K 2105/26
USPC ......................................................... 264/161
See application file for complete search history.

(56) References Cited

U.S. PATENT DOCUMENTS

2007/0161719 A1    7/2007  Rauh
2010/0101454 A1*   4/2010  Wendelin et al. ............ 106/243

OTHER PUBLICATIONS

The translation of the International Preliminary Report on Patentability of Oct. 18, 2011.
Non-Final Office Action dated Aug. 27, 2015, for U.S. Appl. No. 14/581,924, 7 pages.
Notice of Publication of Application dated Aug. 27, 2015, for U.S. Appl. No. 14/581,924, 1 page.

* cited by examiner

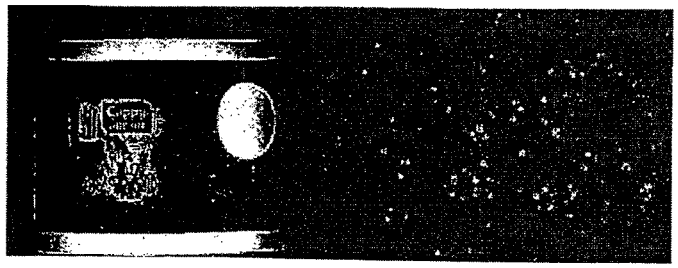
Fig. 3a: Printed foil - result of process according to prior art.
Fig. 3b: Printed foil - result of inventive process
Fig. 4   Foil with label - comparison
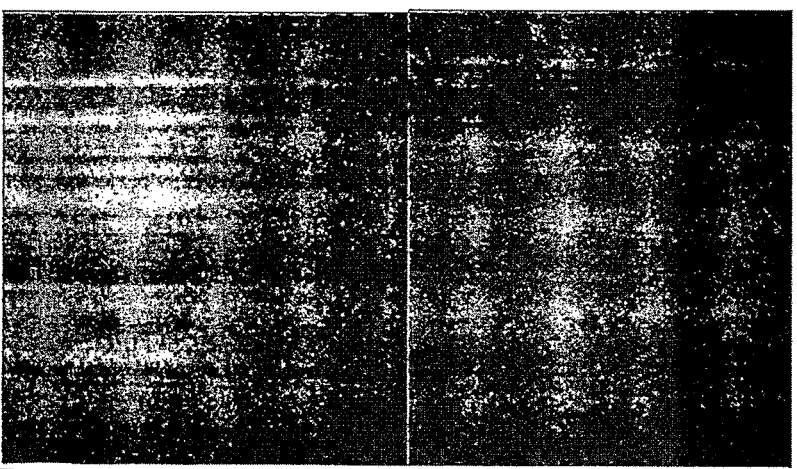
Fig. 5: Foil with label - comparison

METHOD FOR RECYCLING PLASTIC MATERIALS

CROSS-REFERENCES TO RELATED APPLICATIONS

This application is a National Stage of International Application No. PCT/AT2010/000105 filed Apr. 14, 2010, and which claims the benefit of Austrian Patent Application No. A 599/2009, filed Apr. 17, 2009, the disclosures of which are incorporated herein by reference.

The invention concerns a process for recycling plastics according to claim 1, and an arrangement for implementing such a process, according to claim 8.

Processes of a similar kind have long been known in prior art. Thus, it is known that recyclable plastic materials can be first reprocessed in a cutter compactor at an increased temperature—by applying a vacuum if practicable—and subsequently melted in an extruder, that the melt is then filtered, degassed and finally, for example, granulated. Arrangements for implementing such processes are known, for example, from EP 123 771 B, EP 390 873 B or AT 396 900 B.

Furthermore, numerous processes and arrangements exist to optimize the different steps such as degassing the melt. For example, the formation of a pressureless zone upstream of the degassing openings can be provided to ensure the reliable degassing of the plastic material. Furthermore, some arrangements exist with which it is attempted to keep the migration route of the gas bubbles embedded in the plastic as short as possible to allow the gas bubbles to exit the melt before it is conveyed past the last degassing opening. The are in particular arrangements which reshape the plastic material into a tubular form.

There also exist numerous embodiments of various melt filter to remove solid impurities and/or non-molten residual polymer.

These all have the prime purpose of enhancing the quality of the final product.

Object of the present invention is to provide an improved process for recycling plastics, which delivers a final product of high quality, whereby the process can also be implemented at a high rate of productivity.

It is also the object of the invention to provide an arrangement for implementing this process or for recycling plastics, which will also bring these advantages.

This object is achieved by the process for recycling plastics such that the process comprises the following processing steps:
(a) Reprocessing the raw material whereby the material is comminuted if necessary and brought to a fluid form and then heated and permanently mixed while retaining its particulate and flowable form and, if need be, degassed, softened, dried, increased in viscosity and/or crystallized;
(b) Melting the reprocessed material at least to a point where filtration is possible;
(c) Filtering the melt to remove impurities;
(d) Homogenizing the filtered melt;
(e) Degassing the homogenized melt; and
(f) Discharging and/or subsequently processing of the melt, for example by granulating or blow-extrusion treatment,
whereby these processing steps are implemented successively in the above order.

It has been found that processing in the above order of steps results in high product quality while the process is implemented at a high rate of efficiency. It was found to be particularly advantageous when the homogenization step is carried out after filtration but prior to the degassing of the melt, since in that manner, homogenization is not negatively affected by any coarse contaminants or solid impurities or non-molten plastic clusters, while at the same time the subsequent degassing can be carried out effectively, whereby the gas bubbles can be removed completely from the melt. In that manner, a final product of high quality can be achieved that can be used for many different subsequent processing applications.

In practice, unwanted components can be formed, for example, through contamination, fillers or—in case of mixed polymers—by other polymers. Generally, in various ways, these components have a negative effect on the final quality of the plastic, especially on the mechanical and optical properties of the final product. For example, contaminants such as paper fibres, printer ink components, adhesive residues from labels, etc. which remain in the matrix after filtration can lead to a loss of tensile strength in the polymer or to optical defects. Unwanted substances, which remain in the melt in spite of filtration, should therefore be as finely and evenly distributed as possible. This applies equally to contaminants, polymers and fillers. The more finely and evenly these unwanted substances are distributed in the matrix, the less negative is their negative impact in the final product. According to the invention, distribution is accomplished by homogenization which follows filtration.

In addition, homogenization causes a further comminution of the particles. This comminution of unwanted particles also leads to an improvement in the quality of the final product such as to better mechanical properties in the case of injection-moulded parts, to fewer optical impairments in the case of foils, or concretely to greater impact strength when polyolefins are finely distributed in a PET matrix.

Any residual gas would also lead to deficits in final processing, such as the formation of bubbles, torn foils, etc. Thus, the melt filter captures easily gassing substances from the melt, while the remainder is distributed and comminuted in the homogenization phase, and while the resulting shear stress causes temperature-sensitive contaminants to decompose. This gas is removed in the subsequent degassing of the melt.

On the one hand, temperature-sensitive materials are thermally stressed in the homogenization phase and forced to release gas. On the other hand, the remaining particles are distributed in the polymer matrix so finely that they are better protected through further thermal stress caused by the surrounding polymer and are likely to produce less gas. In the subsequent processing steps, such as in a blow-extrusion tower, a gas-free or bubble-free and agglomerate-free film is produced.

Thus, unwanted substances of larger volume, and contaminants, are mostly removed through filtration. Unwanted substances of smaller volume, which pass through the filter and remain in the melt, are finely and equally distributed through homogenization. They therefore are less of a problem in the final product and/or are almost completely removed in the degassing that follows.

If the melt is already homogenized before filtration, as this is sometimes practiced in prior art, contaminants are also comminuted and can pass through the filter surface and are not filtered out. However, this is a disadvantage that is to be prevented.

After filtration, the unwanted substances still present are to be as much comminuted and distributed as possible through homogenization: Through their improved surface/ volume ratio the fine particles release more gas and can be removed more efficiently and more completely through degassing. This is additionally supported through the even distribution in the matrix which further enlarges the surface. Furthermore, the even distribution means an improvement of the material's homogeneity and thus its mechanical and optical properties.

It is therefore important to observe each individual processing step, as outlined above, and the exact order or sequence within the processing chain.

Further advantageous embodiments of the process are described below by means of the characteristics of the sub claims:

According to a preferred embodiment of the process implementation, it is advantageous when the above processing steps are implemented consecutively and directly in chronological and spatial order without intermediate steps.

It is certainly possible to have intermediate steps between the above processing steps, for example that the material or the melt are sometimes temporarily stored or conveyed via non-compressing augers or such, or that other processing steps are added. Yet it has been found that the immediate and direct sequence of the above processing steps is an advantage, especially in terms of productivity and efficiency of the process. As a rule, the quality of the final product also increases when no intermediate steps are taken, and when the material is processed quickly in one continuous processing chain. This type of process implementation is therefore preferred for reasons or quality and economy.

Another advantageous process implementation is characterized in that during homogenization, the melt is sheared and mixed, or subjected to intensive shear stress and tensile stress and greatly accelerated. The process of homogenization is a relatively complex procedure. It is advantageous when the material is subjected to shear stress as well as being mixed, whereby at the same time, the temperature of the melt is increased and the sheared particles are mixed with the less sheared particles. In this manner, an even melt can be produced with finely distributed and very small unwanted substances, and the melt can subsequently by optimally and effectively degassed.

According to another advantageous process implementation, it is provided that the temperature of the material or the melt during, but at least at the end of homogenization and prior to degassing is at least as high as, but preferably higher than the temperatures during all other processing steps. Homogenization is supported when the temperature during homogenization is higher than in the rest of the process. In that manner, the melt can best be prepared for degassing. Experiments have shown that surprisingly the quality of the final product is higher when homogenization takes place at such higher temperatures.

In this connection, it is particularly advantageous when it is provided that the temperature of the material or the melt upon discharge or the temperature during subsequent processing is lower than or at most the same as the temperature during or at the end of homogenization. Surprisingly it has been found that the quality of the final product increases when the temperature of the melt is lowered again after homogenization, or when degassing and in particular the discharge and any subsequent processing takes place at comparatively lower temperatures.

For the advantageous improvement of the degassing performance it can be provided that during homogenization or immediately before or after homogenization, but after filtration and before degassing, nucleating media such as carbon dioxide, nitrogen or water are added to the melt to improve the degassing performance.

For the quality of the final product and the efficiency of the final product, it is also advantageous when it is provided that the melt is cooled down after degassing and during or before discharge or subsequent processing, especially by as much as 20% and preferably by 5% to 10%.

An inventive arrangement for recycling plastics to implement the above process consists of:

(a) at least one reprocessing unit, in particular a conventional cutter compactor or bin with revolving mixing and comminuting tools, whereby the material if necessary is comminuted and brought to a fluid form, heated and permanently mixed while retaining its particulate and flowable form, and if need be also degassed, softened, dried, increased in viscosity and/or crystallized;

(b) at least one melting unit for melting the reprocessed materials at least to a point where filtration is possible, in particular an extruder;

(c) at least one filtration unit for filtering the melt;

(d) at least one homogenization unit for homogenizing the filtered melt;

(e) at least one degassing unit for degassing the homogenized melt;

(f) at least one discharge unit for discharging and/or at least one subsequent processing unit for processing the melt, whereby the above named units are series connected and coupled and that the plastic material or the melt passes through these units in the above order.

By series connecting these units in the process, the material or the melt must pass through the inventive arrangement or the inventive processing chain in a defined order. In that manner and with this configuration, productivity can be improved, and as described above, the material quality can be enhanced.

While it is possible in the advantageous embodiments of the arrangement for other units to be added, but according to an advantageous further development of the arrangement it is also possible for the units to follow each other consecutively in time and space and without any additional intermediate steps. That keeps the processing route of the material or the melt short and allows that the arrangement can be reduced to just the most essential units. This lowers the direct costs and also accelerates the implementation of the process and the running times while the product quality remains the same and is often even improved.

It is also advantageous when a control means is provided to independently regulate the temperatures of the material or the melt in the different units. The independent temperature control in each individual unit and in every individual processing step is advantageous for regulating product quality.

Thus, it has surprisingly been shown in experiments that it is advantageous when the control means regulates the temperatures such that the temperature of the material or the melt during, but at least at the end of homogenization in the homogenization unit and before degassing in the degassing unit is at least as high as or preferably higher than in all other processing steps in the other units, especially that the temperature of the material or the melt during discharge in the discharge unit or the temperature during successive processing in the successive processing unit is lower than or at most the same as the temperature during or at the end of homogenization in the homogenization unit. The quality of such a final product was improved in several respects.

An advantageous embodiment of the inventive arrangement provides that the homogenization unit, in particular an auger, is designed such that the melt therein is sheared and mixed, or subjected to an intensive shear stress and tensile stress and greatly accelerated. In that manner it is possible to configure the shear regions and mixing regions such that the flow conditions in the auger lead to good homogenization.

An advantageous arrangement is characterized in that the individual processing units (2) to (5), preferably (2) to (6) and in particular (2) to (7), are axially arranged behind each other and/or along a common longitudinal axis. In that manner, a place-saving configuration can be maintained in which the material or the melt follows a clearly prescribed route.

To improve the degassing performance, it can be provided that a unit for the addition of nucleating media such as carbon dioxide, nitrogen or water can be added to the melt, whereby the unit adds the nucleating media during homogenization or directly before or after homogenization, but after filtration and before degassing.

It is also advantageous when it is provided that, especially in the discharge unit, a cooling means is included for the melt discharging from the degassing unit, for example a cylinder or an auger, which is able to cool the melt after degassing and during or before discharge or successive processing, in particular by as much as 20%, but preferably by 5% to 10%.

Below, the inventive process and the inventive arrangement are described by means of examples and with reference to the figures, where FIG. 1 shows a sketched schematic view of an inventive arrangement;

FIGS. 3a and 3b show the results of comparative experiments with printed foils;

FIGS. 4 and 5 show the results of comparative experiments with foils to which adhesive labels are attached.

Figure 1:
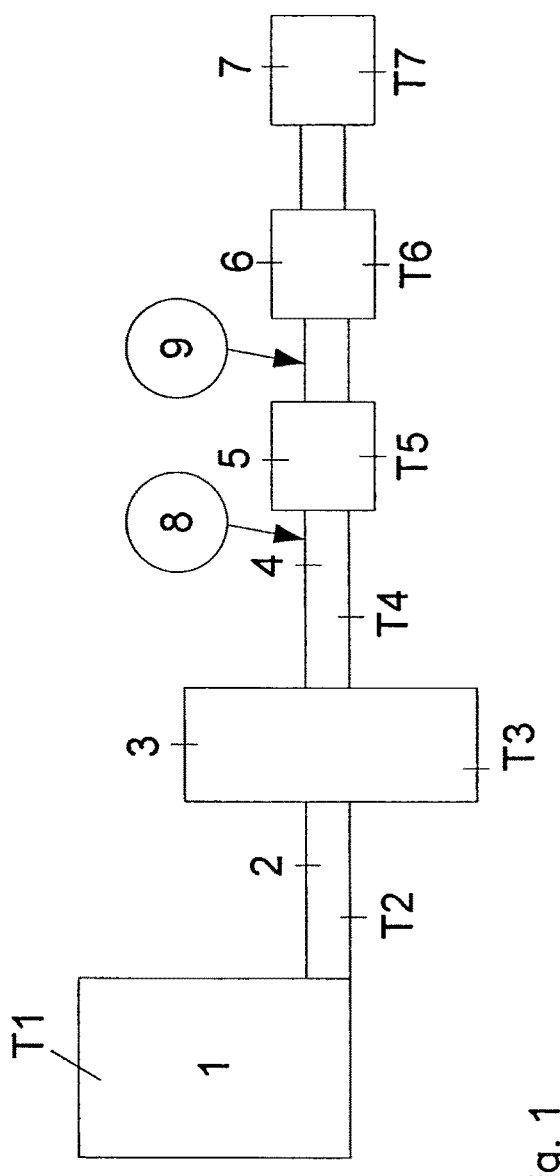

FIG. 1 shows an arrangement or configuration for recycling plastics. The configuration includes from left to right a reprocessing unit 1, which as a rule is a conventional cutter compactor or reprocessing bin containing rotating mixing and comminuting tools process and if need be comminute the presented plastic material. The material is permanently in freely flowing form and is always kept particulate and flowable by the mixing and comminuting tools in spite of the increased temperature. In reprocessing unit 1, the material is not yet molten, bust at best heated to a temperature just below the melting point, in particular to a temperature in the range of the material's Vicat softening point. Depending on the type of polymer to be processed, the polymer is already degassed in this early processing step, softened, dried, crystallized and/or increased in viscosity. If practicable, a vacuum can be applied in reprocessing bin 1. Various designs of such reprocessing units 1 have been well known in prior art. Only as an example, reference is made to EP 123 771 B, EP 390 873 B, AT 396 900AT 407 235, At 407 970, etc.

In the lower part of reprocessing unit 1 a melting unit 2 is connected, in particular compacting extruder. The melting unit 2 melts the reprocessed material at least to a point where filtration of the material is possible. In the arrangement according to FIG. 1, the melting unit 2 is immediately and directly connected to reprocessing unit 1, for which various conventional connecting means, radial or tangential, are known. This has the advantage that the mixing and agitating tools in reprocessing unit 1 stuff or bring the softened plastic material into the input region of melting unit 2.

Alternatively, the material can also be conveyed to the melting unit 2 via an intermediate unit, for example a non-compressing transfer device such as a stuffing auger, in particular an auger with constant thread depth which connects the reprocessing unit 1 directly or indirectly with the melting unit 2, but does not allow a continuous material stream into melting unit 2.

Downstream from melting unit 2 is a filtration unit 2 for filtering the melt. Various designs of such melt filters are also known in prior art. For example, solid foreign bodies, unwanted polymers and/or non-molten polymer residues are removed in that manner.

Subsequently the melt passes into a homogenization unit 4. This usually consists of a rotating body such as an auger, which is designed to have a certain sequence of shearing regions and mixing regions. The intensive mixing of the polymer for homogenization is accomplished by complex flow conditions in the interior of the rotating body or auger or in the various auger sections. Apart from axial flows in conveying direction there are also radial flows and axial flows against the conveying direction, so-called leakage flows. In the shearing regions, the temperature of the melt is increased, while in the mixing regions the sheared particles are mixed together with the less sheared particles, resulting in a certain temperature exchange. In that manner, unwanted particles are comminuted and distributed, and the melt is effectively homogenized and prepared for degassing.

Directly downstream, a degassing unit 5 is provided to remove any gas bubbles and gas enclosures from the homogenized melt. Various arrangements are also know in prior art that can effectively remove gas from the melt. Thus, for example, the auger can be very long, a pressureless zone can be provided, or the plastic material can be degassed via a thin film or tube.

On the very right in the schematic view according to FIG. 1 is a discharge unit 6 and a subsequent processing unit 7. The discharge unit 6 serves to transfer the degassed melt to subsequent processing unit 7. The latter can be, for example, a granulating unit, a blow film unit or an injection moulding unit which turns the melt back into a solid form again, for example into a granulate or a foil.

In the embodiment shown in FIG. 1, units 1 to 7 are series connected, and the plastic material passes through units 1 to 7 in the prescribed order continuously from left to right. Furthermore in the configuration according to FIG. 1, the individual units are immediately and directly coupled together, and the material passes from each unit consecutively and directly without intermediate steps to the next unit. Further units, in particular intermediate storage, transfer augers, etc. are possible, but not shown in FIG. 1. That is why the arrangement according to FIG. 1 is relatively short and compact.

Units 2 to 7. i.e. melting unit 2 to subsequent processing unit 7, are on a common longitudinal axis, i.e. are arranged behind each other. This makes the entire arrangement very narrow and space-saving.

Furthermore, a control means is provided which can regulate the temperatures in each individual unit. In that manner, the temperature can be set as required anywhere in the processing chain.

Advantageously the temperature is regulated such that the temperature $T_4$ in homogenization unit 4 or the temperature $T_4$ of the material or the melt during homogenization, but at least at the end of homogenization, but in any case before the degassing begins in degassing unit 5, is as high or higher than in each of the other processing steps or in any other unit of the arrangement. Thus for example, the temperature T2 in melting unit 2, the temperature T3 in filtration unit 3, the temperature T5 in degassing unit 5, the temperature 6 in discharge unit 6, and the temperature T7 in subsequent processing unit 7 are lower than or at a maximum as high as the temperature 4 in homogenization unit 4.

Furthermore, a unit 8 is provided for the addition of nucleating media, via which carbon dioxide, nitrogen or water, etc, can be added to the melt. Such nucleating media are added in particular in homogenization unit 4 just before or after homogenization, but in any case after filtration or also before degassing.

In discharge unit 6, a melt cooling device 9 is provided for cooling the melt as it is discharged from the degassing unit 5. This device may consist, for example, of a cylinder or an auger. The temperature of the melt is cooled by as much as 20%, preferably by 5 to 10%.

Figure 2:
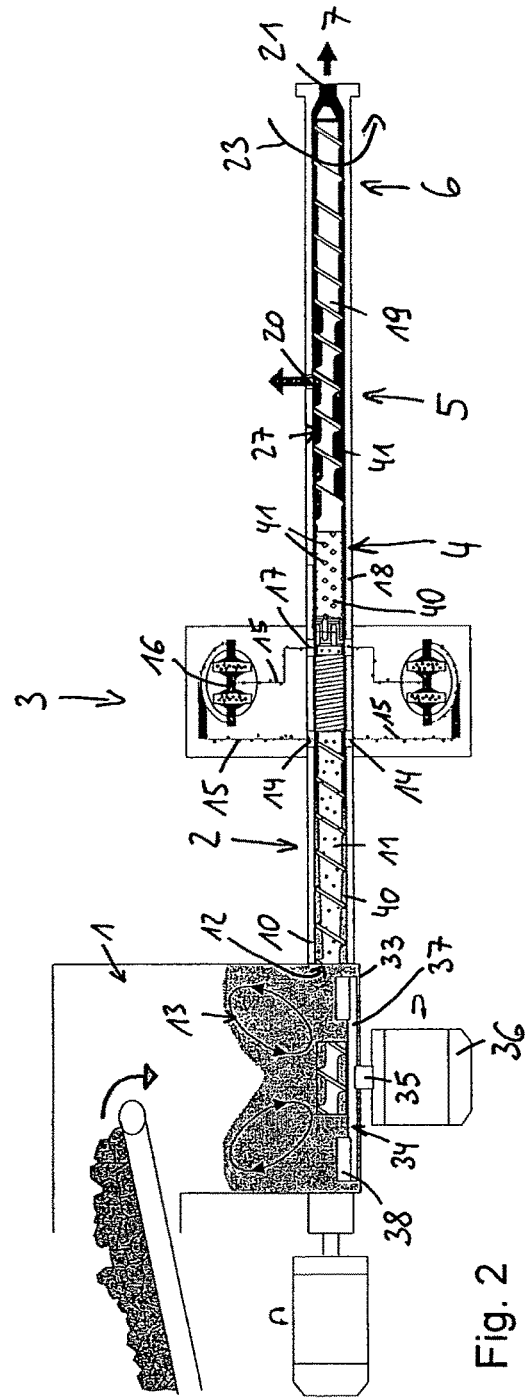
FIG. 2 shows a concrete embodiment of an inventive arrangement.

FIG. 2 expands upon and is based on FIG. 1 and shows in detail a concrete embodiment of an advantageous arrangement to implement the process according to the invention.

This arrangement comprises of a reprocessing unit 1 in form of a pot-shaped bin or cutter compactor 1 into which the plastic material to be processed is filled at the top. In the area of the bottom 33 of bin 1, a tool 34 is pivoted in a conventional manner about a vertical axis in the middle of bin 1 and rotated via a shaft 35 that passes through bottom 33 and is driven by a motor 36. The tool 34 has at least two radial arms 37 provided with working edges 38 that are designed as cutting edges for the plastic material. These working edges 38 mix the plastic material and may also comminute it if required.

The plastic material thus processed is moved into a melting unit 2, namely in a housing 10 of a first auger section 11. This auger section 11 extends into an opening 12 formed by housing 10. When the tools 34 rotate about the axis of shaft 35, the plastic material rotation in bin 1 rises up in the form of a mixing spout along the bin walls, which is indicated by arrows 13. The centrifugal force exerted upon the rotating plastic material supports the intake of the plastic material through opening 12 into housing 10 of auger 11, which is tangentially connected to bin 1. Alternatively, auger housing 10 can also be almost radially connected to bin 1. The core diameter of the first auger section 11 enlarges in the direction away from opening 12, which compresses and plasticizes the plastic material pulled in by auger section 11.

The plasticized material is discharged from housing 10 of the first auger section 11 through openings 14 into filtration unit 3 and flows via connecting channels 15 to at least one filter 16 which filters out the coarse contaminants contained in the plastic melt.

After passing filtration unit 3, the plasticized material passes through connecting channels 15 and via intake openings 17 into a homogenization unit 4 located in the interior of another housing 18. Arranged in homogenization unit 4 is a homogenizer 40 which is coaxially aligned with auger 11 and has the form of a cylindrical rotating body, whereby homogenizer 40 rotates inside housing 18 and thus exerts a shearing and mixing force upon the polymer film or tube that flows around it. To increase the mixing affect and also the shearing effect, a large number of projections 41 is arranged on the outer surface of homogenizer 40. Any gases that form can already escape in this section.

Also in housing 18, a second auger section 19 is pivoted which connects coaxially to homogenizer 40. This second auger section 19 conveys the plasticized plastic material into a degassing section or degassing unit 5, past degassing openings 20 through which the gases escaping from the plastic material are discharged, collected and if need be passed on to be further used.

After passing these degassing openings 20, the plastic material is conveyed via a discharge unit 6 in the form of a discharge auger with a slight shear effect to an outlet 21, to which tools or subsequent processing units 7, such as granulating devices, can be connected.

Practically the two auger sections 11, 19 are located in drilled holes 40 or 41 of the two housings 10, 18, whereby the drilled holes are in coaxial alignment to each other and both have the same diameter. The coaxial alignment of the two auger sections 11, 19 and the homogenizer 40 allows that in a simple manner, these two auger sections 11, 19 are united in a single component with a common core, and that these two auger sections 11, 19 can be driven together from one side, i.e. from the left side in FIG. 2, The rotating direction of the two auger sections 11, 19 is indicated by an arrow 23.

To promote degassing of the processed plastic material in housing 18, the degassing unit 5 has a pressureless zone 27 that is located in the area of intake opening 17 and degassing opening 20 and is formed by a part of auger section 19 with a reduced core diameter. After degassing opening 20, this reduced core diameter again increases to a full core diameter of discharge unit 6 to ensure that the plastic material is again under pressure and thus sufficiently plasticized.

In the embodiment shown in FIG. 2, units 1 to 7 are also series connected, and the plastic material or the melt runs through units 1 to 7 continuously in the prescribed order. In addition, the individual units are spatially immediately and directly coupled with each other, and the material passes, from each individual unit consecutively and directly and without intermediate steps to the next unit downstream. Units 2 to 6, i.e. melting unit 2 to discharge unit 6 also lie on a common longitudinal axis, and their augers are axially arranged behind each other, which makes the entire arrangement very small and space-saving.

Without deviating from the core of the invention, various embodiments of the arrangement are possible. Thus, in each unit, for example, single augers, double augers or even multiple augers are possible. Furthermore, the individual processing steps can be operated under atmospheric conditions or with the support of a vacuum.

Numerous design embodiments are possible for each individual unit, which persons skilled in the art can take from prior art. The temperatures, dwell times and other parameters depend for the most part on the material to be processed or recycled and persons skilled in the art can adapt these. However, the inventive advantages can only be achieved if persons skilled in the art use the process and/or the arrangement of the present invention.

The examples below demonstrate the advantageous technical effects of the inventive process and the inventive arrangement:

Contaminated plastic materials such as foils that were printed or had adhesive labels were processed in comparative experiments, namely once with an arrangement known from prior art without homogenization according to the conventional method, and parallel to it with the inventive arrangement according to the inventive process with homogenization, whereby the directly comparable operating parameters, such as temperatures, throughputs, dwell times, pressure, etc. were kept as comparable as possible in the cutter compactor or during subsequent processing.

EXAMPLE 1

Processing of Printed Plastic Foils

FIGS. 3a and 3b show a comparison of the original material and the resulting final products. The left portion in FIG. 3a and FIG. 3b shows the initial foil to be treated in the form of a plastic foil with coloured printing. The right portion shows a foil produced 100% from the regenerate after processing.

It can be seen that in the process according to prior art or with the arrangement according to prior art, the material is not completely degassed, but that small gas bubbles, caused by the decomposed printer inks, remain in the final product. With the inventive process, in particular through homogenization prior to degassing, the degassing result is further improved, and that hardly any gas bubbles can be seen.

EXAMPLES 2 AND 3

Processing of LD-PE Film with Paper Labels

FIGS. 4 and 5 also show a comparison: on the left side is the result after to the previous process, and on the right side is the result after the process according to the invention. In both cases, the original material consisted of packaging foils of LD-PE, contaminated by paper labels. The contamination rate was about 1% of total weight. FIGS. 4 and 5 show microscopic views of film made 100% of the recycled material after processing. Filtration fineness in FIG. 4 is 110 μm, in FIG. 5 it is 125 μm.

It is recognizable that on the right side (process according to the invention), the contaminants, especially paper articles, adhesive residues, but also gas bubbles, are fewer, smaller and more finely distributed than on the left side (prior art). Therefore the mechanical and optical properties of the foils on the right side are better.

In all cases, the proportion of contaminants in the final product is clearly reduced, and the quality therefore increased.

The invention claimed is:

1. A system for recycling a material, comprising:
   (a) at least one reprocessing unit, configured to form a reprocessed material by heating and mixing the material while retaining a particulate and flowable form of the material;
   (b) at least one melting unit configured to form a melt by melting the reprocessed material at least to a point where filtration of the melt is possible;
   (c) at least one filtration unit configured to filter the melt to form a filtered melt;
   (d) at least one homogenization unit configured to homogenize the filtered melt, wherein the homogenization unit comprises first and second homogenizers, wherein the first homogenizer comprises a Maddock shearing element, wherein the second homogenizer comprises a cylindrical rotatable body having an outer surface with a plurality of projections, wherein the first homogenizer receives the filtered melt and generates a first homogenized melt, and wherein the second homogenizer receives the first homogenized melt and generates a second homogenized melt;
   (e) at least one degassing unit configured to degas the second homogenized melt to form a degassed melt; and
   (f) at least one member of the group consisting of:
      at least one discharge unit configured to discharge the degassed melt from the system to form a discharged melt; and
      at least one subsequent processing unit configured to process the degassed melt to form a processed melt,
   wherein the reprocessing, melting, filtration, homogenization, degassing, and discharge or subsequent processing units are serially connected in the above order,
   wherein the temperatures of each of the first and second homogenized melts are equal to or greater than the highest temperature of the temperatures of the reprocessed material, the melt, the filtered melt, the degassed melt, and the discharged or processed melt.

2. The system of claim 1, wherein the reprocessing, melting, filtration, homogenization, degassing, and discharge or subsequent processing units are connected in series consecutively and directly in spatial order without intermediate units.

3. The system of claim 1, wherein the temperatures of each of the first and second homogenized melts are greater than the temperature of the discharged or processed melt.

4. The system of claim 1, wherein the homogenization unit is configured such that the filtered melt is sheared and mixed therein or is subjected to an intensive shear stress and tensile stress and is greatly accelerated.

5. The system of claim 1, wherein the melting, filtration, homogenization, and degassing units lie on a common longitudinal axis.

6. The system of claim 1, further comprising a unit configured to add nucleating media into the material, wherein the unit configured to add the nucleating media into the material is disposed downstream of the filtration unit and upstream of the degassing unit.

7. The system of claim 1, further comprising a cooling mechanism disposed downstream of the degassing unit, wherein the cooling mechanism is configured to cool the degassed melt.

8. The system of claim 7, wherein the cooling mechanism is configured to cool the degassed melt by less than or equal to 20%.

9. The system of claim 7, wherein the cooling mechanism is configured to cool the degassed melt by 5% to 10%.

* * * * *